United States Patent [19]
Paul

[11] Patent Number: 6,052,709
[45] Date of Patent: Apr. 18, 2000

[54] APPARATUS AND METHOD FOR CONTROLLING DELIVERY OF UNSOLICITED ELECTRONIC MAIL

[75] Inventor: Sunil Paul, San Francisco, Calif.

[73] Assignee: Bright Light Technologies, Inc., San Francisco, Calif.

[21] Appl. No.: 08/997,692

[22] Filed: Dec. 23, 1997

[51] Int. Cl.[7] .............................. H04N 1/00; H06F 17/30
[52] U.S. Cl. ............................................. 709/202; 709/204
[58] Field of Search .................................... 709/202, 206, 709/204, 205; 714/40, 49, 50

[56] References Cited

U.S. PATENT DOCUMENTS

| | | | |
|---|---|---|---|
| 5,619,648 | 4/1997 | Canale et al. | 709/206 |
| 5,675,507 | 10/1997 | Bobo II | 709/206 |
| 5,790,789 | 8/1998 | Suarez | 709/202 |
| 5,826,022 | 10/1998 | Nielson | 709/206 |
| 5,835,087 | 11/1998 | Herz et al. | 345/327 |
| 5,862,325 | 1/1999 | Reed et al. | 709/201 |

OTHER PUBLICATIONS

Ranum, M.J. et al., "Implementing a generalized tool for network monitoring," Proceedings of the Eleventh Systems Administration Conference (LISA XI), San Diego, CA, Oct. 26–31 1997, pp. 1–8.

Primary Examiner—Zarni Maung
Assistant Examiner—Khanh Quang Dinh
Attorney, Agent, or Firm—Covington & Burling

[57] ABSTRACT

In a system and method and system for controlling delivery of unsolicited electronic mail messages, one or more spam probe e-mail addresses are created and planted at various sites on the communications network in order to insure their inclusion on large-scale electronic junk mail ("spam") mailing lists. The mailboxes corresponding to the spam probe e-mail addresses are monitored for incoming mail by a spam control center. Upon receipt of incoming mail addressed to the spam probe addresses, the spam control center automatically analyzes the received spam e-mail to identify the source of the message, extracts the spam source data from the message, and generates an alert signal containing the spam source data. This alert signal is broadcast to all network servers and/or all user terminals within the communications network. A filtering system implemented at the servers and/or user terminals receives the alert signal, updates stored filtering data using the spam source data retrieved from the alert signal, and controls delivery of subsequently-received e-mail messages received from the identified spam source. The filtering system controls delivery of the unsolicited e-mail messages by discarding the messages without displaying them to the user, displaying the messages to the user with a "JUNK" or similar marker, or otherwise processing the spam mail as desired by the network provider and/or the network users. The filtering system may also filter e-mail messages sent by the user terminals.

7 Claims, 6 Drawing Sheets

| "FROM" | "TO" | "CC" | "BCC" | "SUBJECT" |
|---|---|---|---|---|
| SPAM.COM | MASSMAILING | MASSMAILING | MASSMAILING | SOLICITATION |
| ADVERTISER.COM | | | | CREDIT CARD OFFER |
| MASSMARKET.COM | | | | |
| EXFIANCEE.COM | | | | |

APPARATUS AND METHOD FOR CONTROLLING DELIVERY OF UNSOLICITED ELECTRONIC MAIL

FIELD OF THE INVENTION

The present invention relates to a method and system for controlling the delivery of unsolicited electronic mail messages over an electronic communications network such as the Internet.

BACKGROUND OF THE INVENTION

The rapid increase in the number of users of electronic mail and the low cost of distributing electronic messages, for example, via the Internet and other communications networks has made mass marketing via electronic mail ("e-mail") an attractive advertising medium. Consequently, e-mail is now frequently used as the medium for widespread marketing broadcasts of unsolicited messages to e-mail addresses, commonly known as "spam."

Electronic mass marketers (also called "spammers") use a variety of techniques for obtaining e-mail address lists. For example, marketers obtain e-mail addresses from postings on various Internet sites such as news group sites, chat room sites, or directory services sites, message board sites, mailing lists, and by identifying "mailto" address links provided on web pages. Using these and other similar methods, electronic mass marketers may effectively obtain large numbers of mailing addresses, which become targets for their advertisements and other unsolicited messages.

Users of Internet services and electronic mail, however, are not eager to have their e-mail boxes filled with unsolicited e-mails. This is an increasing problem for Internet service providers (ISPs) such as America Online (AOL®) or Microsoft Network (MSN®) and other entities with easily identifiable e-mail addresses such as large corporations (e.g., IBM®, Microsoft®, General Motors®, etc.). ISPs object to junk mail because it reduces their users' satisfaction of their services. Corporations want to eliminate junk mail because it reduces worker productivity.

Accordingly, there is a need for a system that automatically and efficiently identifies unsolicited e-mails messages and controls the delivery of these messages to users, for example by preventing delivery of the messages to the users' in-boxes, identifying the messages as unsolicited messages by displaying the messages in a distinctive display mode, or otherwise controlling the delivery of such messages to the users.

SUMMARY OF THE INVENTION

Accordingly, it is the object of the present invention to provide a system and method for controlling the delivery of unsolicited electronic mail messages ("spam") over an electronic communications network such as the Internet by identifying the source of identified spam transmissions using "spam probes," and automatically alerting network servers and/or user terminals to sources of spam in order to activate an effective filter or "spam wall" program implemented at network servers or user terminals or both.

According to the method and system of the present invention, one or more spam probe email addresses are created and planted at various sites on the communications network in order to insure their inclusion on large-scale electronic junk mail ("spam") mailing lists. The mailboxes corresponding to the spam probe e-mail addresses are monitored for incoming mail by a spam control center. Upon receipt of incoming mail addressed to the spam probe addresses, the spam control center automatically analyzes the received mail to identify the source of the message, extracts and processes the source data from the received message, and generates an alert signal containing the processed source data. The alert signal may also contain filtering instructions used to enable network servers and user terminals to automatically detect spam. This alert signal is broadcast to all network servers or all user terminals, or both, within the communications network. A filtering system implemented at the servers or user terminals automatically receives the alert signal, automatically updates stored filtering data using the source data retrieved from the alert signal, and automatically controls delivery of subsequently-received e-mail messages from the identified spam source. Any filtering instructions are also stored and used to process incoming e-mail messages. The filtering system controls delivery of the unsolicited e-mail messages by discarding the messages without displaying them to the user, displaying the messages to the user with a "JUNK" or similar marker, or by otherwise processing the spam mail as desired by the network provider or the network users. The filtering system may also be used to filter e-mail messages sent from the user terminals.

A system for controlling delivery of unsolicited electronic mail according to the present invention includes a communications network including at least one user terminal and a control center. The control center includes a distributor for distributing a probe address to multiple sites on the communications network likely to be accessed by mailers of unsolicited electronic mail, a processor for receiving electronic mail messages addressed to the probe address and extracting source data from the received electronic mail messages, and an alert signal generator coupled to the processor for generating and transmitting an alert signal incorporating the extracted source data and, optionally, filtering instructions. The system according to the present invention may further include at least one network server coupled to the communications network and a plurality of user terminals coupled to the network server. A filtering application may be implemented in each of the network servers, each of the user terminals, or both. The filtering application receives the alert signal, updates stored filtering data upon receipt of the alert signal using the source data and filtering instructions retrieved from the alert signal, and filters electronic mail messages addressed to each of the user terminals in accordance with updated filtering data. The filtering system may also be used to filter e-mail messages sent from the user terminals.

A method of identifying sources of unsolicited electronic mail according to the present invention includes the steps of:
(a) creating a probe address; distributing the probe address to multiple sites on a communications network likely to be accessed by mailers of unsolicited electronic mail;
(b) monitoring the communications network for electronic mail addressed to the probe address;
(c) upon receipt of an electronic mail message addressed to the probe address, extracting and processing source data from the received electronic mail message; and
(d) generating an alert signal incorporating the processed source data.

A method for controlling delivery of unsolicited electronic mail according to the present invention includes the steps of:
(a) creating a probe address; distributing the probe address to multiple sites on a communications network likely to be accessed by mailers of unsolicited electronic mail;

(b) upon receipt of an electronic mail message addressed to the probe address, extracting and processing source data from the received electronic mail message;

(c) transmitting an alert signal incorporating the processed source data and, optionally, filtering instructions;

(d) receiving the alert signal at a filtering application for filtering electronic mail messages; updating filtering data stored by the filtering application using the source data and filtering instructions retrieved from the alert signal; and (e) filtering the electronic mail messages received by the filtering application in accordance with the updated filtering data.

The foregoing and other features, aspects, and advantages of the present invention will become more apparent from the following detailed description when read in conjunction with the accompanying drawings.

DETAILED DESCRIPTION OF THE PREFERRED EMBODIMENTS

The present invention will now be described with reference to the accompanying drawings, which are provided as illustrative examples of preferred embodiments of the present invention. Notably, the present invention may be implemented using software, hardware or any combination thereof as would be apparent to one of skill in the art.

Figure 1:
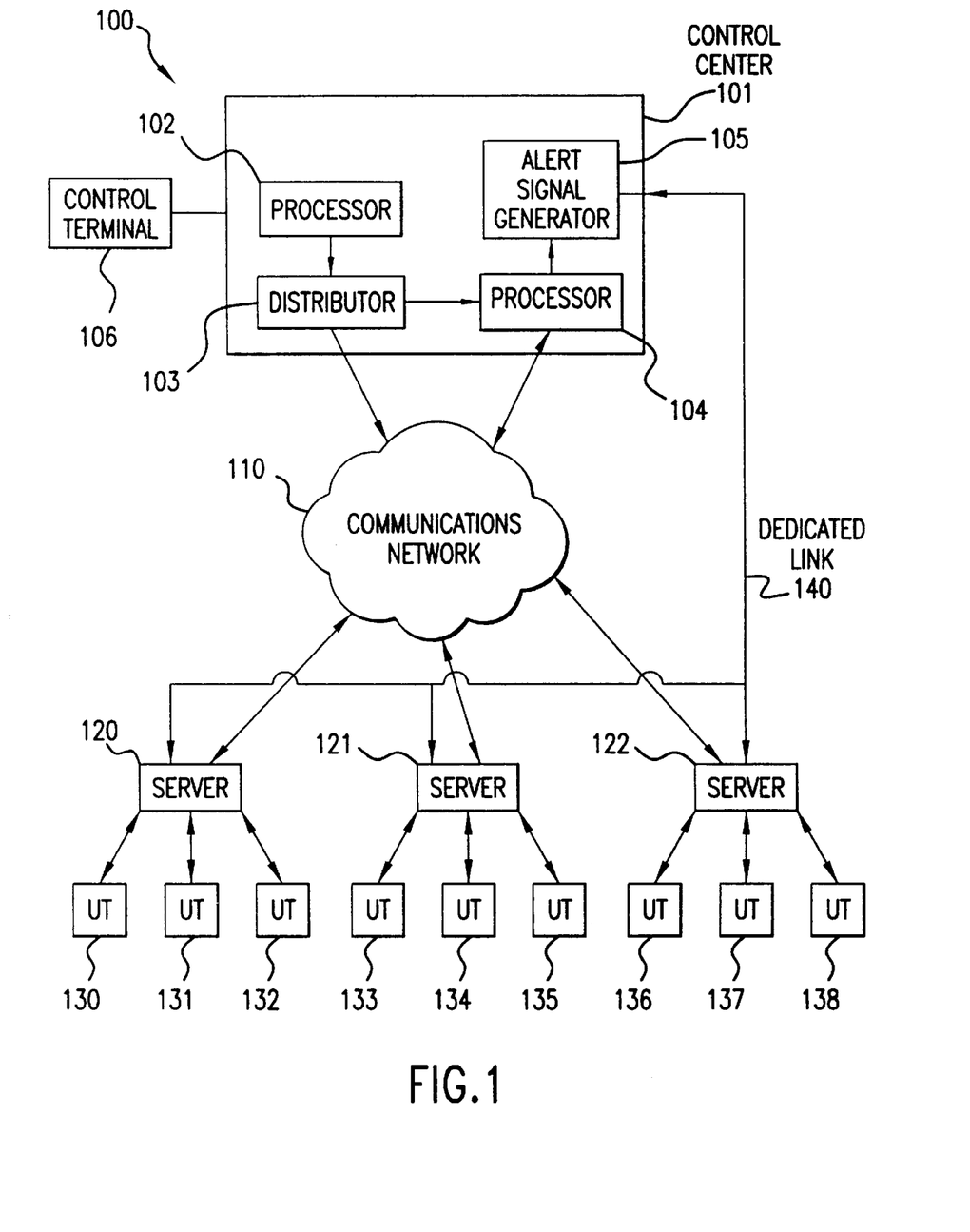
FIG. 1 provides a block diagram of a system for controlling delivery of unsolicited electronic mail according to the present invention.

FIG. 1 depicts a preferred embodiment of a system 100 for controlling the delivery of unsolicited electronic mail messages. With reference to FIG. 1, a system 100 for controlling delivery of unsolicited electronic mail messages, e.g., spam, according to the present invention includes a control center 101 coupled to a communications network 110, for example, the Internet or other wide area network (WAN). A plurality of network servers 120, 121, and 122 are coupled to the control center 101 and the communications network 110. User terminals 130–138 are respectively coupled to servers 120–122 as shown in FIG. 1.

The control center 101 includes a processor 102 for creating spam probe addresses, a distributor 103 coupled to processor 102 for distributing the spam probe e-mail addresses to various sites within the communications network 110; a processor 104 coupled to the communications network 110 and distributor 103 for receiving e-mail addressed to the spam probe address and extracting and processing source data from the received e-mail messages addressed to the spam probe address; and an alert signal generator 105 coupled to processor 104 for generating alert signals to the servers 120–122 or user terminals 130–138, or both. The alert signals incorporate the source data from the e-mail messages addressed to the spam probe address extracted by processor 104 and may also incorporate filtering instructions entered, for example, via control terminal 106. Control terminal 106 is coupled to the control center 101 to control and monitor operation of the control center 101. Additional control terminals (not shown) may optionally be provided. The components of the control center 101 need not be consolidated in the same location and may be implemented as a distributed system of processors, components of a single processing system, or in other configurations as would be apparent to one of skill in the art.

Operation of the preferred embodiment of FIG. 1 will now be described in further detail. The system 100 for controlling delivery of unsolicited electronic mail messages according to the present invention as shown in FIG. 1 uses one or more "spam probes" created by processor 102 to identify sources of unsolicited e-mail or spam. A spam probe is an e-mail address specifically selected to make its way onto as many spammer mailing lists as possible. The spam probe is also selected to appear high up on the spammers' lists in order to receive mailings relatively early in the spammers' mailing process. For example, the spam probe address may be selected to appear at the top of an alphabetized mailing list (e.g., "Aardvark @aol.com"). In a preferred embodiment of the system according to the present invention, a certain percentage of assignable e-mail addresses offered by an ISP or private network are reserved for use as spam probes.

Once a spam probe is created using processor 102, distributor 103 distributes the spam probe to a number of sites on the communications network 110 likely to be browsed by spammers. For example, on the Internet, sites likely to be browsed by spammers may include chat room sites, directory services sites, mailing lists, message board sites, and news group sites as well as "mailto:" address links provided on posted web pages. In this way, the spam probe address preferably would be distributed to various locations on the network and posted with the intention that spammers will find the address and add to their mailing list as they browse the network.

After the spam probe has been distributed on the network 110, processor 104 stores the spam probe address received from distributor 103 and monitors the network 110 for e-mail messages addressed to the spam probe address. According to a preferred embodiment of the present invention, the mailbox corresponding to the spam probe address is located within processor 104. In this embodiment, all e-mail messages addressed to the spam probe address are automatically forwarded to processor 104 by the network 110.

In addition to receiving incoming e-mail messages automatically forwarded by the network 110, processor 104 may also use polling techniques known in the art to retrieve e-mail messages from probe address mailboxes by transmitting outgoing requests to the spam probe mailbox. Use of such methods helps to insure both timeliness of receipt of spam and immunity to denial of service attacks (for example, wherein a spammer sends numerous processing commands to the spam probe server in order to keep the server busy, thereby preventing the server from receiving incoming e-mail messages).

Once the information contained in the received e-mail message is identified and received by processor 104, processor 104 analyzes this information using processing methods known in the art and extracts the source header data from the received e-mail message. In another preferred embodiment, a human operator may also perform additional analysis of the received email messages using control terminal 106. Processor 104 then outputs the extracted source data to alert signal generator 105.

The processing performed by processor 104 may include analysis of the source header data from the received e-mail message in order to determine, for example, the Internet Protocol (IP) address of the sender or the address of the server(s) relaying the e-mail message from the sender to the spam probe mailbox using known look-up techniques. Processor 104 may also extract and analyze data from other fields of the received e-mail message, including other header fields such as the SUBJECT or MESSAGE ID fields, and the body of the e-mail message. Processor 104 provides the analyzed data to the alert signal generator 105.

Upon receipt of the data output from processor 104, alert signal generator 105 preferably generates an alert signal incorporating the source data extracted from the received e-mail message as well as other data analyzed by processor 104 (as described above). The alert signal may also incorporate filtering instructions to be implemented by the user terminals or network servers. Filtering instructions may be provided to the alert signal generator 105, for example, via control terminal 106. Alert signal generator 105 preferably then transmits the alert signal to each server 120–122 either via an optional dedicated communication link 140 or via the communications network 110.

Filtering instructions may be transmitted from the control center to the servers or user terminals or both to update and control the filtering operation performed by the servers or user terminals or both. For example, a filtering instruction may instruct the server or user terminal to compare the domain of the MESSAGE ID with the earliest source in the series of servers listed in the received field. If the domains of the two fields do not match, the server or user terminal would mark the e-mail message with a code, such as JUNK, indicating its status as spam. Other appropriate filtering instructions as would be apparent to one of skill in the art may also be provided in order to insure effective spam filtering.

The system for controlling delivery of unsolicited e-mail shown in FIG. 1 includes a user terminal-based filtering application or a server-based filtering application, or a combination thereof. According to a preferred embodiment of the present invention, filtering applications implemented in the servers or user terminals are implemented using hardware or software, or a combination thereof, as is known in the art. The filtering applications receive and process the alert signals transmitted by alert signal generator 105 of the control center 101. Upon receipt of the alert signal, the filtering application (whether located in the servers or user terminals) extracts the source and other data (including filtering instructions, if any) from the alert signal. The filtering application stores the data and uses it to update its filtering process as described in further detail below with reference to FIGS. 2 through 6.

Figure 2:
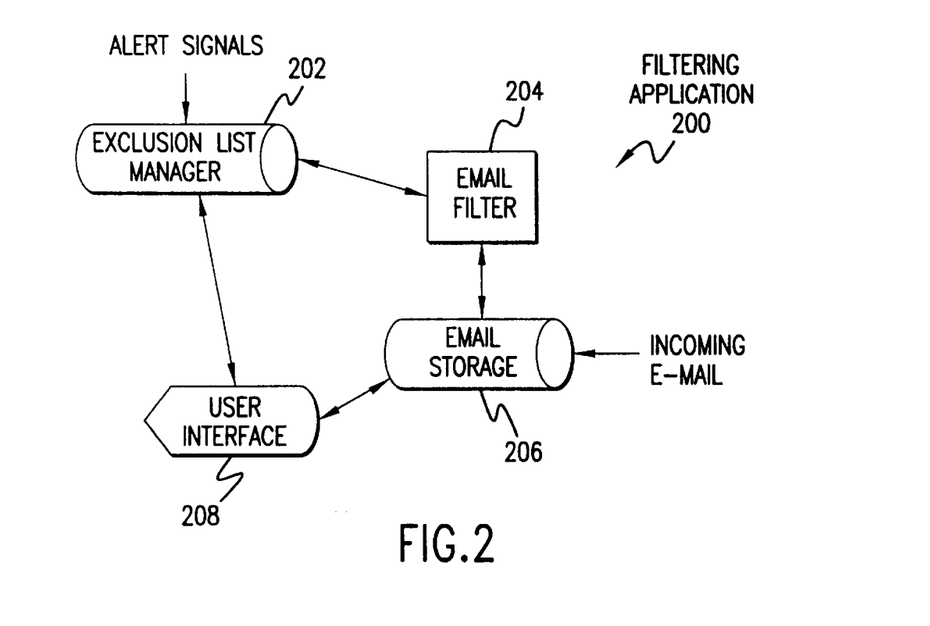
FIG. 2 provides a block diagram of user terminal-based filtering application for use in the system of FIG. 1.
Figure 3:
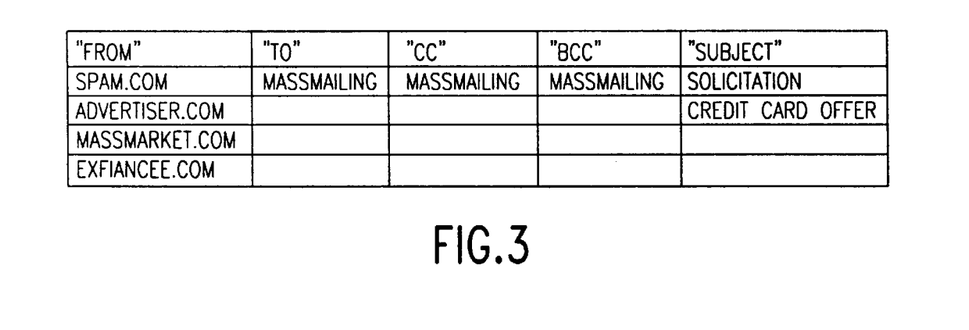
FIG. 3 provides an example of data stored in an exclusion list used by the filtering application of FIG. 2.

In the preferred embodiment depicted in FIG. 2, a user-terminal filtering application 200 for use in the present invention includes an exclusion list manager 202 for creating, storing and automatically maintaining a user exclusion list. The user exclusion lists preferably includes all identification data needed to determine the status of incoming e-mail messages. Data in the exclusion list may be divided into categories corresponding to the fields of incoming e-mail messages as illustrated in FIG. 3. For example, filtering using the "FROM" category of the exclusion list may be sufficient to control delivery of spam messages. However, users and/or service providers may optionally implement filtering based upon additional exclusion list categories, such as the "TO", "BCC," "CC," and "SUBJECT" e-mail headers and other headers. Fltering may also be based on the contents in the body of the email. The user exclusion list may be automatically created and maintained and/or created and modified manually by the user or service provider. The user terminal may also perform filtering based upon filtering instructions received from the control center 101.

Figure 4:
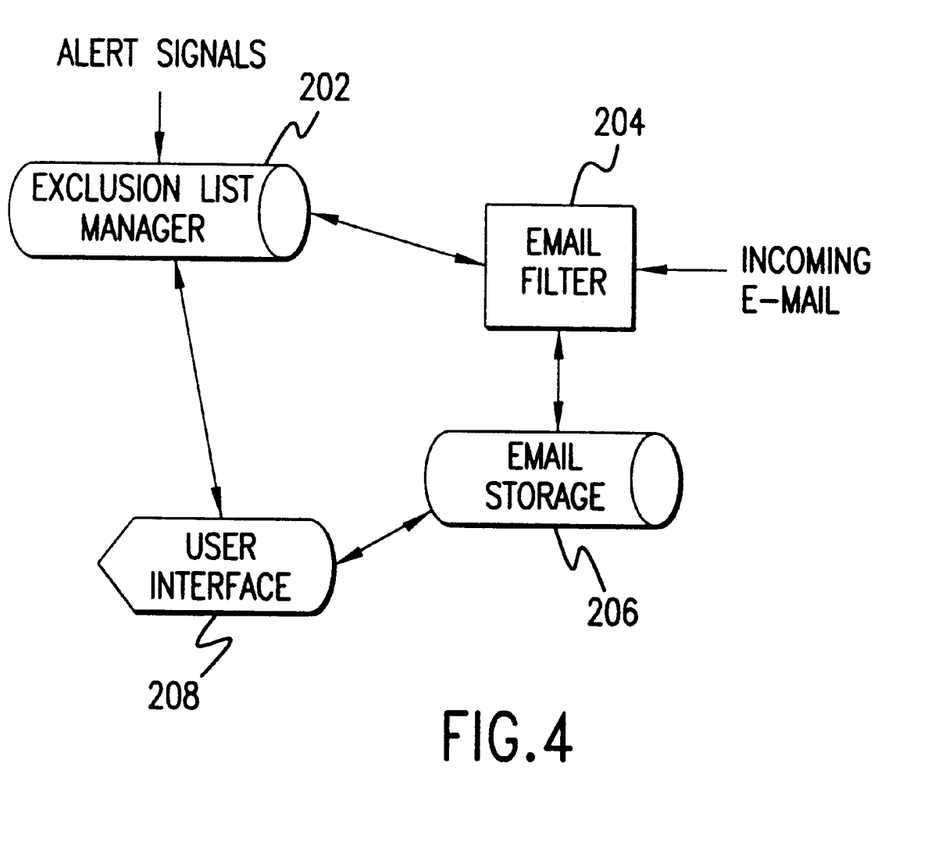
FIG. 4 provides a block diagram of an alternative embodiment of a user terminal-based filtering application for use in the system of FIG. 1.

In the preferred embodiment depicted in FIG. 4, alert signals received from the control center 101 are automatically processed by the filtering application so that the source data extracted from the alert signals are automatically added to the stored exclusion list. Thus, source data detected by the spam probe, processed by the control center 101, and transmitted in the alert signals are used to automatically update the filtering applications in the user terminals 130–138.

The user terminal filtering application in the preferred embodiment depicted in FIG. 2 further includes an e-mail storage database 206, which receives and stores incoming e-mail and stores records of outgoing e-mail. An e-mail filter 204 filters the incoming e-mail stored in store 206 in accordance with the user exclusion list stored in database 202. A user interface 208 is provided to receive inputs from the user and to display e-mail information to the user. The user interface 208 may be implemented, for example, using an e-mail software package known in the art, such as Netscape® Messager®, Microsoft® Outlook®, Microsoft® Exchange®, Lotus® cc: mail®, Lotus Notes®, Novell® Groupwise®, Eudora®, or America OnLine®. User interface 208 may be used to display a user's mailbox, receive and process e-mail messages and inputs from the user, manage the user's mailbox, display mailbox management information to enable the user to manage the mailbox, and perform other functions as are known in the art.

Filtering of incoming e-mails may preferably be performed as follows. If the data in any of the "FROM" field of the incoming e-mail message match data stored in the corresponding data category of the exclusion list manager 202, the e-mail is marked by the filter 204 with a first display code indicating the "JUNK" status of the message. Optionally, the filter 204 may use multiple display codes indicating multiple status levels of "JUNK." If no match is detected between the fields of the received e-mail message and the stored exclusion list, the e-mail is marked with a second display code indicating the "OK" status of the message. Notably, the filtering system may be programmed to search not only for precise text in matching data fields, but also for similar text using known text searching techniques.

The marking of the incoming e-mail may be accomplished using known programming techniques, for example, by adding an additional field of information to the received e-mail format or by altering one or more existing e-mail fields to indicate the display status of the email.

In one embodiment of the filtering application for use in the present invention, messages marked with the first display code indicating the "JUNK" status of the message are not displayed in the user's in-box and are automatically discarded by the filter. Alternatively, the "JUNK" messages may be modified to indicate to the user that the messages are unsolicited, for example, by automatically inserting the word "JUNK" at the beginning of the message's "SUBJECT" header field, by displaying the message in a distinctive color in the user's in-box, by inserting the messages in a special folder in the user's in-box, or by other suitable means. Messages marked with the second display code indicating the "OK" status of the message preferably are automatically displayed in the user's inbox by the user interface 108 in a display mode visually distinct from the display mode for any displayed "JUNK" messages. Various known display methods may be used to distinguish "OK" mail messages from "JUNK" mail messages on the user's display screen.

In another preferred embodiment of the filtering system according to the present invention, e-mail messages marked with the first display code ("JUNK" mail) are further processed by the filter using user preference data entered by the user. The user may, for example, desire to receive unsolicited e-mail messages relating only to one or more specific subjects. Accordingly, the user may enter into his or her terminal a list of subjects which is stored as preference data by the filtering application. The filter application compares the subject data of the received e-mail message with subject preference data entered by the user. Notably, the subject data from the received message may include "SUBJECT" header information, the full text of the e-mail message, or both. A text search may be performed to determine whether the subject data from the received e-mail contains any of the subject words or phrases entered by the user as preference data. If a match is detected, the e-mail message is marked with a third display code and displayed to the user in a third distinctive mode using known display techniques. These e-mail messages may, for example, be automatically placed in a special folder created by the user or the filtering application or displayed in a distinctive color.

In yet another preferred embodiment of a filtering application for use in the present invention, the filtering application stores predetermined classification data, which are used to sort incoming unsolicited e-mail messages into predetermined categories. The filtering application may, for example, search the "SUBJECT" header data of the received e-mail message, other headers, the text of the message, or all three, to determine whether the subject data from the received message contain any words or phrases matching the subject information describing each predetermined category. In this embodiment, each predetermined subject category of messages is associated with a specific display code. Accordingly, received messages in each predetermined category would be displayed to the user in different display modes to visually distinguish the categories on the user's display screen. The user may select to receive unsolicited e-mail messages in one or more of the predetermined categories, or none of the categories.

A filtering system according to the present invention may be implemented at the user terminal either as an integrated function within a user's e-mail program, such as Netscape Messager, Microsoft Outlook, Microsoft Exchange, Lotus cc: mail, Lotus Notes, Novell mail, Eudora, or AOL, or as a separate application that interacts with the user's existing e-mail application. In either embodiment, the e-mail filter 204 interacts with the e-mail store 206 to access, modify, and categorize e-mail messages as described above. The filtering system may also be used to filter outgoing e-mail messages sent by the user terminals.

FIG. 4 illustrates an alternative embodiment in which the filtering application is implemented, for example, at the user terminal 130 shown in FIG. 1. The e-mail filter 204 receives and filters incoming e-mail messages before they are stored in e-mail store 206, and may also filter outgoing messages sent by the user terminals. This embodiment may be implemented using a known message communications means, such as Microsoft's Mail API (MAPI) or an Internet mail protocol such as Post Office Protocol (POP3), IMAP or Simple Mail Transfer Protocol (SMTP). In a preferred embodiment using user terminal filtering, the system according to the present invention may be implemented as an add-on system to a known e-mail software package using MAPI configured as a network service provider. This embodiment has the advantage of simplifying the implementation of the present invention at the user terminal.

Figure 5:
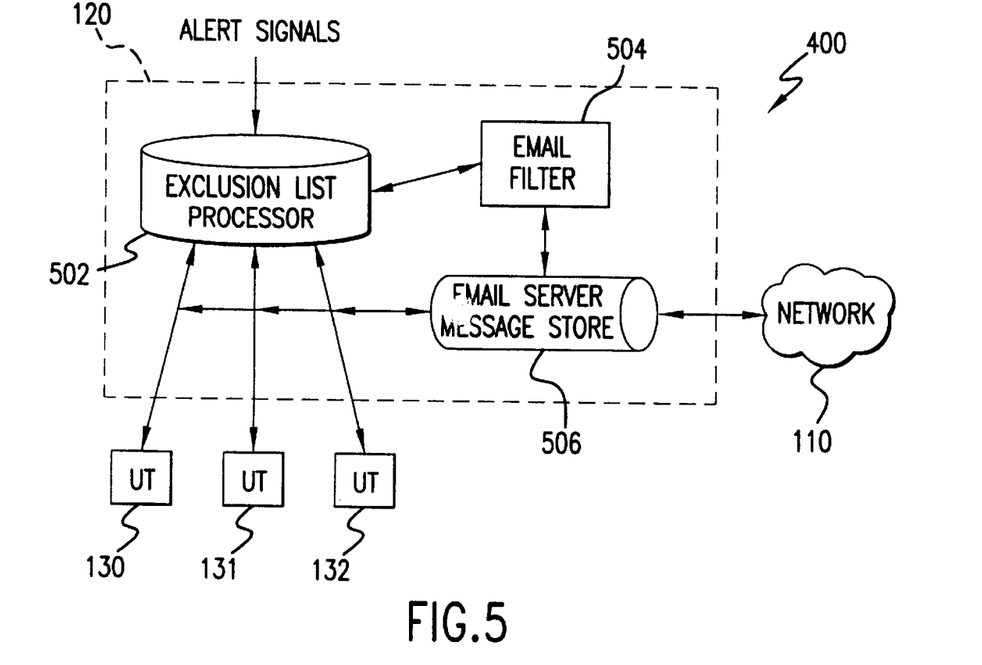
FIG. 5 provides a block diagram of network server-based filtering application for use in the system of FIG. 1.

FIG. 5 illustrates preferred a server-side embodiment in which the present invention is implemented within network servers. This embodiment enables filtering to be performed at a relatively small number of locations for all users within a network. A server, e.g., 120 shown in FIG. 1, receives and routes e-mail messages to and from a plurality of user terminals 130–133 shown in FIG. 1. The server 120 includes an e-mail server message store 506 for receiving and storing all e-mail messages transmitted within the network 110 and an e-mail filter 504. An exclusion list processor 502 stores and maintains at least one exclusion list for each e-mail address that is serviced by the e-mail server 120. For example, in the network configuration of FIG. 5, the exclusion list processor 502 maintains a separate user exclusion list for each user terminal, for example, user terminals 130–133 shown in FIG. 1. The server 120 may also filter outbound messages sent by the users using a similar filtering operation.

An additional functionality of the present invention that may be implemented within the above-described preferred embodiment or separately implemented in a different embodiment of the present invention is a functionality by which multiple exclusion lists are maintained. One or more selected exclusion lists are applied in filtering for all user terminals 130–133. One or more selected exclusion lists are applied in filtering for only certain user terminals, e.g., only user terminal 130. Accordingly, this embodiment of the present invention offers selective filtering of certain user terminals and general filtering of all user terminals.

The operation of the components of the server 120 shown in FIG. 5 is similar to the corresponding components in the user-site system of FIG. 2. All e-mail received by server 120 is stored in e-mail store 506. The e-mail filter 504 filters the stored e-mail messages in accordance with the information stored in the exclusion list processor 502. E-mail addressed to each user terminal 130–133 shown in FIG. 1 is separately filtered using the exclusion list stored for each user respectively. Once the e-mail stored in store 506 is processed by e-mail filter 504, the filtered e-mail is then forwarded to the users' respective user sites.

The filtering process performed for each user terminal, e.g., 130, by the e-mail filter 504 is the same as that performed by filter 204 in FIG. 2. The filter 504 compares the data stored in the "FROM" header field (and optionally the "TO," "CC," "BCC," and "SUBJECT" fields and associated sub-headers fields) of the incoming e-mail messages with corresponding categories of data stored in the exclusion list processor 502. If data in any of these fields of the incoming email matches data stored in a corresponding field of the inclusion list processor 502, the incoming e-mail is marked "JUNK" and marked with a first display code. If no match is detected, the e-mail filter labels the e-mail message as "JUNK" by marking the message with a second display code. Further processing to display the JUNK messages by subjects or subject categories as described above with reference to FIG. 5 may also be performed by the server's filtering application.

In the preferred server-side embodiment shown in FIG. 5, the e-mail filter 504 interacts with the e-mail message store 506 that processes the e-mail and performs other known functions for a multiplicity of e-mail addresses or accounts. In this embodiment, the e-mail store 506 may store additional information about the category of each e-mail message. In an alternative preferred embodiment, the status of e-mail messages is handled in a separate database (not shown) outside the message store 506.

The exclusion list processor 502 may store an exclusion list for each e-mail address or, alternatively, an exclusion list for each group of e-mail addresses organized by domain or other group. According to another preferred embodiment, each exclusion list created and maintained by the exclusion list processor 502 includes an additional data field to identify characteristics of at least one user account or e-mail address. This embodiment has the advantage of providing centralized management of account information.

Figure 6:
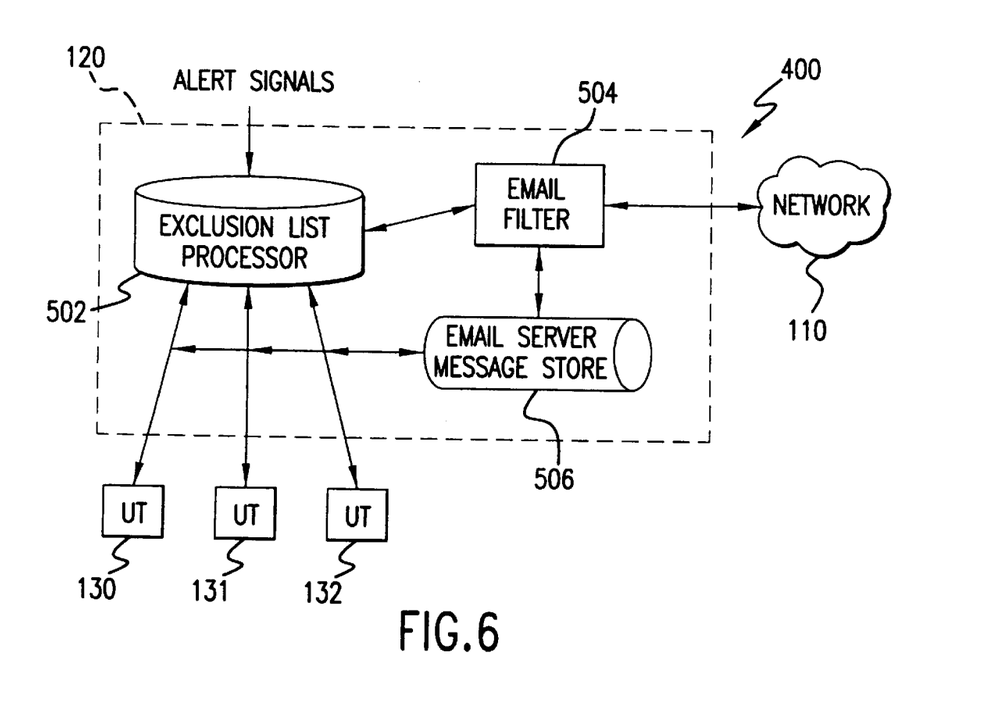
FIG. 6 provides a block diagram of an alternative embodiment of a network server-based filtering application for use in the system of FIG. 1

FIG. 6 illustrates an alternative preferred embodiment in which the e-mail filter receives and filters incoming e-mail messages before they are stored in e-mail store 506. This embodiment may be implemented using a known message communications means, such as MAPI or an Internet mail protocol such as POP3, IMAP or SMTP. This embodiment has the advantage of reducing the data traffic flow on a communications link by filtering out junk e-mail before it is stored at the server.

The preferred embodiment of a server-based filtering application has the advantage of enabling quick deployment of the invention because server software can generally be updated more quickly than user terminal software. Filtering rules may be updated in real-time or near real-time on the server, allowing rapid response to new instances of junk mail. This embodiment also has the advantage of ease of implementation in an environment where there are multiple email users. This embodiment also has the potential advantage of reducing the wasted bandwidth of sending junk e-mail messages to users who will not read them.

Additional control of the filtering applications implemented at the user terminals or servers, or both, may optionally be provided via the control terminal 106 shown in FIG. 1 and/or a control terminal (not shown) coupled to one or more of servers 120–122. Using these control terminals, a system operator may enter source data or subject data, or both, to be added to the filtering application exclusion lists. Accordingly, a service provider may prevent users from receiving e-mails from specific sources or e-mail messages including certain subject matter (e.g., pornographic subject matter) by adding source data and/or subject data to the filtering application exclusion lists. The network users may or may not be given authorization to access or change the exclusion list data entered by the system operator. Service provider entries in the exclusion list may or may not be displayed to the users.

Users may manually implement similar limitations for their mailboxes by manually entering data into the exclusion list.

Figure 7:
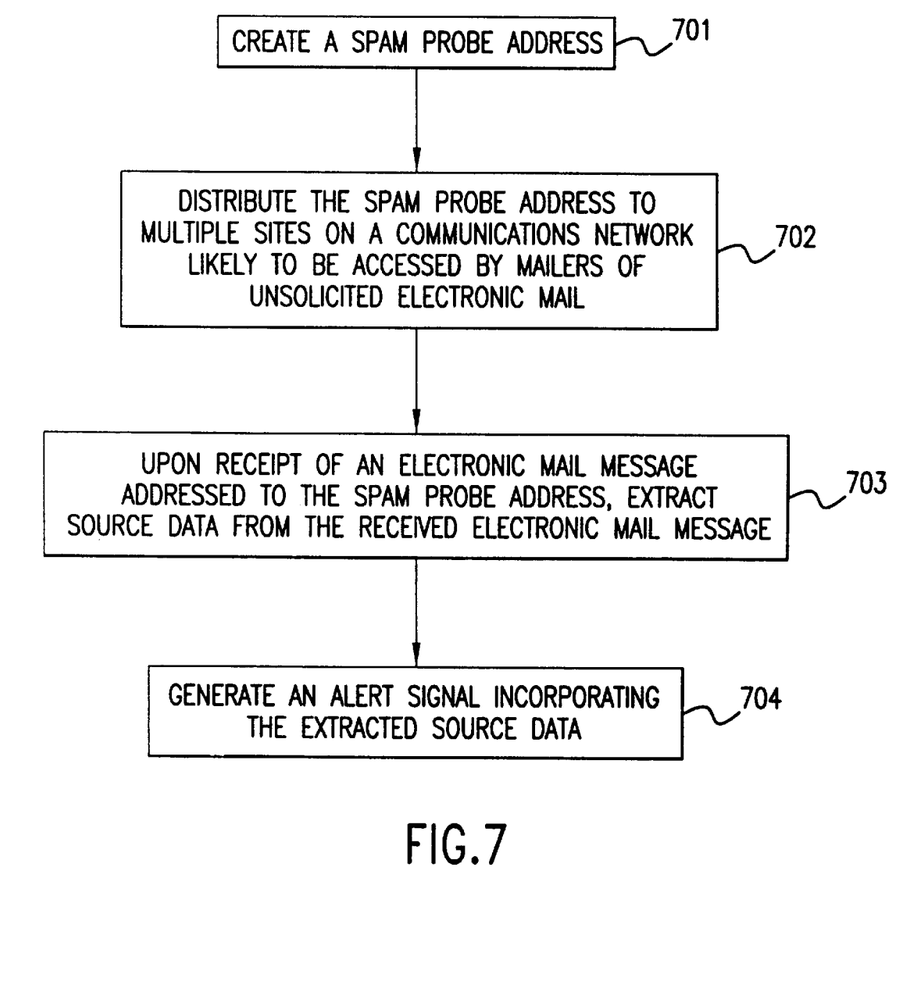
FIG. 7 provides a process flow chart for a method for identifying sources of unsolicited email messages according to the present invention.

With reference to FIG. 7, a method for identifying sources of unsolicited electronic mail according to the present invention includes the following steps:

701—creating a spam probe address;
702—distributing the spam probe address to multiple sites on a communications network likely to be accessed by mailers of unsolicited electronic mail;
703—upon receipt of an electronic mail message addressed to the spam probe address, extracting source data from the received electronic mail message; and
704—generating an alert signal incorporating the extracted source data.

Figure 8:
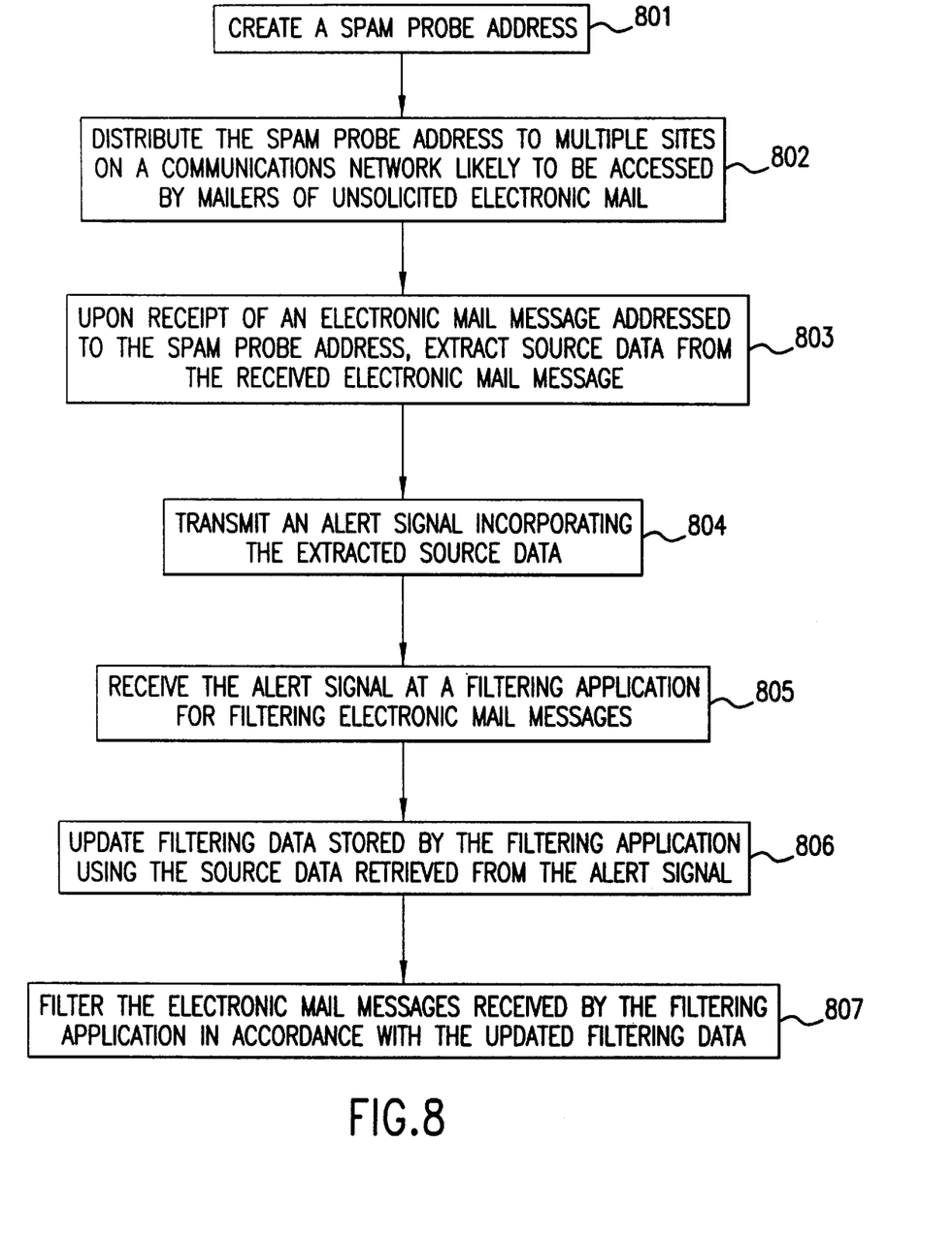
FIG. 8 provides a process flow chart for a method for controlling delivery of unsolicited e-mail messages according to the present invention.

With reference to FIG. 8, a method of controlling delivery of unsolicited electronic mail messages according to the present invention includes the following steps:

801—creating a spam probe address;
802—distributing the spam probe address to multiple sites on a communications network likely to be accessed by mailers of unsolicited electronic mail;
803—upon receipt of an electronic mail message addressed to the spam probe address, extracting source data from the received electronic mail message;
804—transmitting an alert signal incorporating the extracted source data;
805—receiving the alert signal at a filtering application for filtering electronic mail messages;
806—updating filtering data stored by the filtering application using the source data retrieved from the alert signal; and
807—filtering the electronic mail messages received by the filtering application in accordance with the updated filtering data.

The filtering method according to the present invention may also be implemented in combination with one or more inclusion-based filtering methods as would be apparent to one of skill in the art.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

I claim:

1. A system for controlling delivery of unsolicited electronic mail, comprising:

a communications network;

a plurality of user terminals coupled to said communications network, each of said plurality of user terminals having a unique e-mail address, wherein each of said plurality of user terminals comprises a filtering application for receiving incoming electronic mail messages addressed to said unique e-mail address of said user terminal and filtering said incoming electronic mail messages based upon stored filtering data; and a control center, comprising a distributor for generating a probe address and transmitting said probe address to at least one site on said communications network, wherein said probe address is different from each of said unique email addresses of each of said plurality of user terminals, a processor for receiving electronic mail messages addressed to said probe address, and for extracting source data from said received electronic mail messages, and a database update signal generator coupled to said processor for generating and transmitting a database update signal incorporating said extracted source data;

wherein each of said plurality of user terminals receives said database update signal from said control center, updates said stored filtering data in response to said database update signal, and filters electronic mail messages received by said user terminal in accordance with said updated filtering data.

2. A system according to claim 1, wherein said user terminals filter electronic mail messages sent from other of said user terminals in accordance with said updated filtering data.

3. A system according to claim 1, wherein said probe address is transmitted to sites on said communications network that provide address information for senders of unsolicited electronic mail messages.

4. A system for controlling delivery of unsolicited electronic mail, comprising:

a communications network;

a plurality of user terminals, wherein each of said plurality of user terminals has a unique e-mail address;

a server coupled to said communications network and each of said plurality of user terminals, wherein said server comprises a filtering application for receiving incoming electronic mail messages addressed to said unique e-mail address of each of said plurality of user terminals and filtering said incoming electronic mail messages based upon stored filtering data; and a control center, comprising a distributor for generating a probe address and transmitting said probe address to at least one site on said communications network, wherein said probe address is different from each of said unique email addresses of each of said plurality of user terminals, a processor for receiving electronic mail messages addressed to said probe address, and for extracting source data from said received electronic mail messages, and a database update signal generator coupled to said processor for generating and transmitting a database update signal incorporating said extracted source data;

wherein said server receives said database update signal from said control center, updates said stored filtering data in response to said database update signal, and filters electronic mail messages addressed to each of said plurality of user terminals in accordance with said updated filtering data.

5. A system according to claim 4, wherein said filtering application updates said filtering data in response to said database update signal by adding said extracted source data to said filtering data stored in said server.

6. A system according to claim 4, wherein said server also filters electronic mail messages sent from each of said plurality of user terminals.

7. A system according to claim 4, wherein said probe address is transmitted to sites on said communications network that provide address information for senders of unsolicited electronic mail messages.

* * * * *